C. AND H. H. DOERING.
METHOD OF AND APPARATUS FOR MANUFACTURING BUTTER SUBSTITUTES.
APPLICATION FILED NOV. 6, 1920.
1,434,049.
Patented Oct. 31, 1922.
3 SHEETS—SHEET 1.
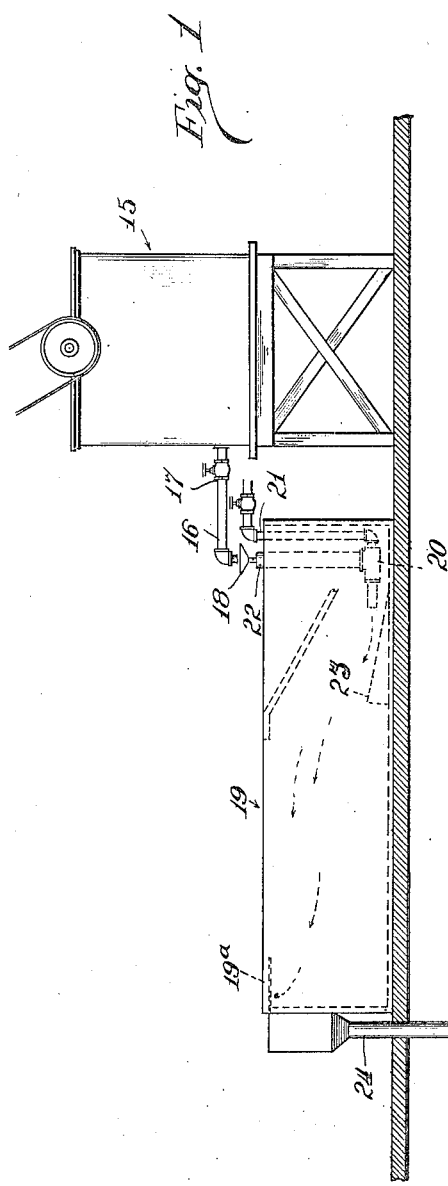
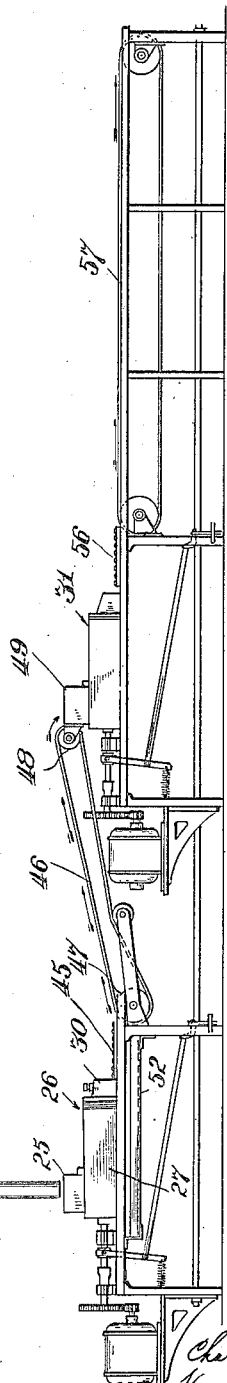

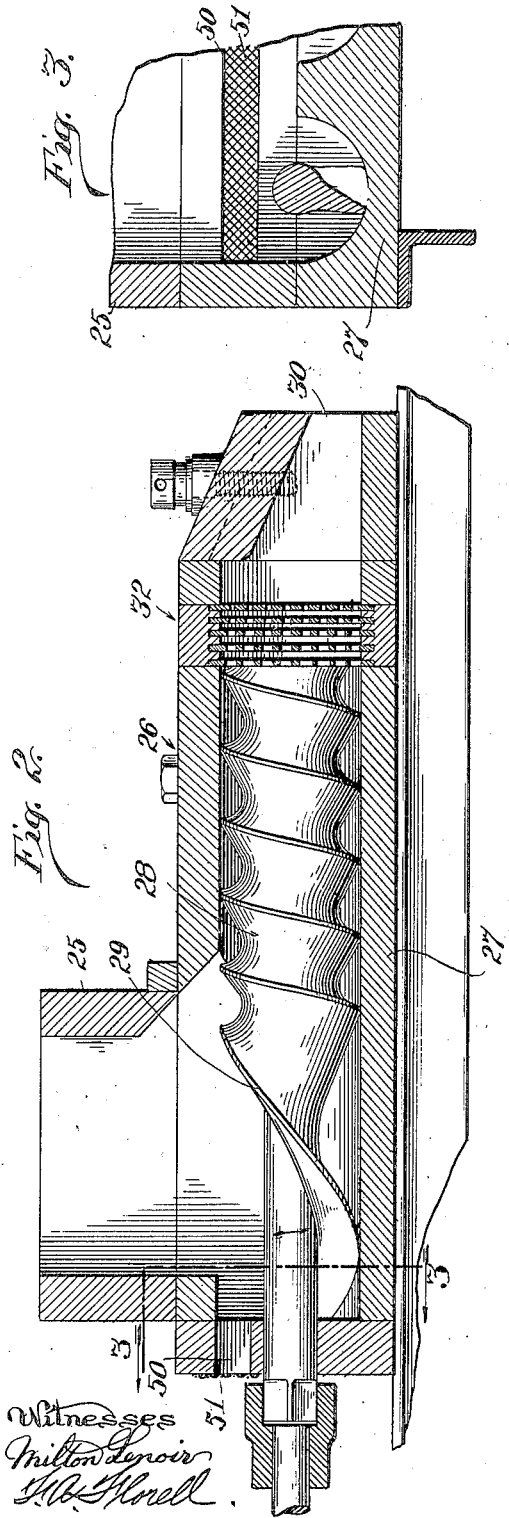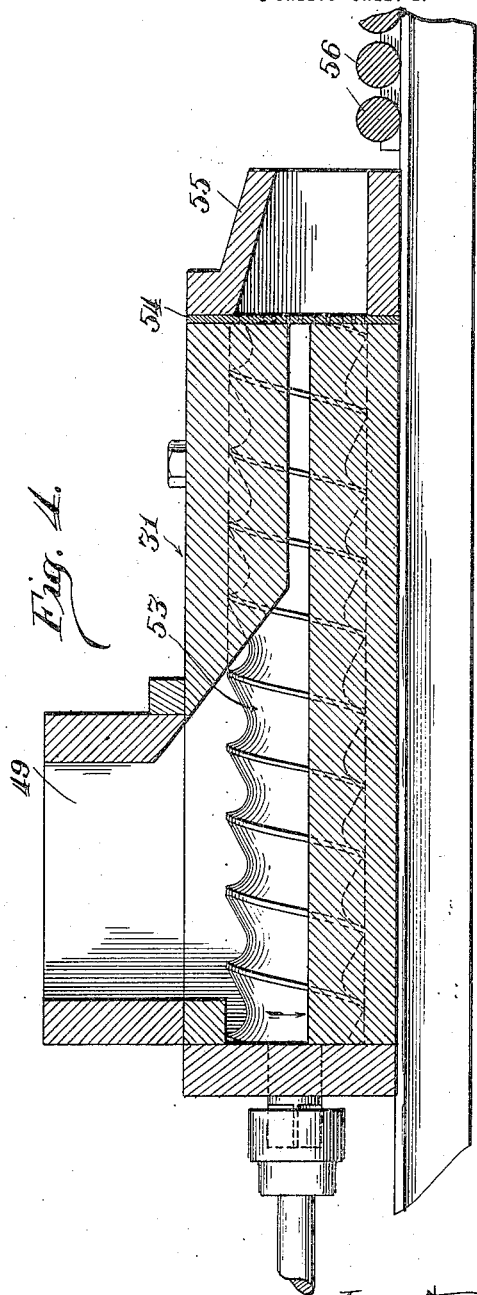

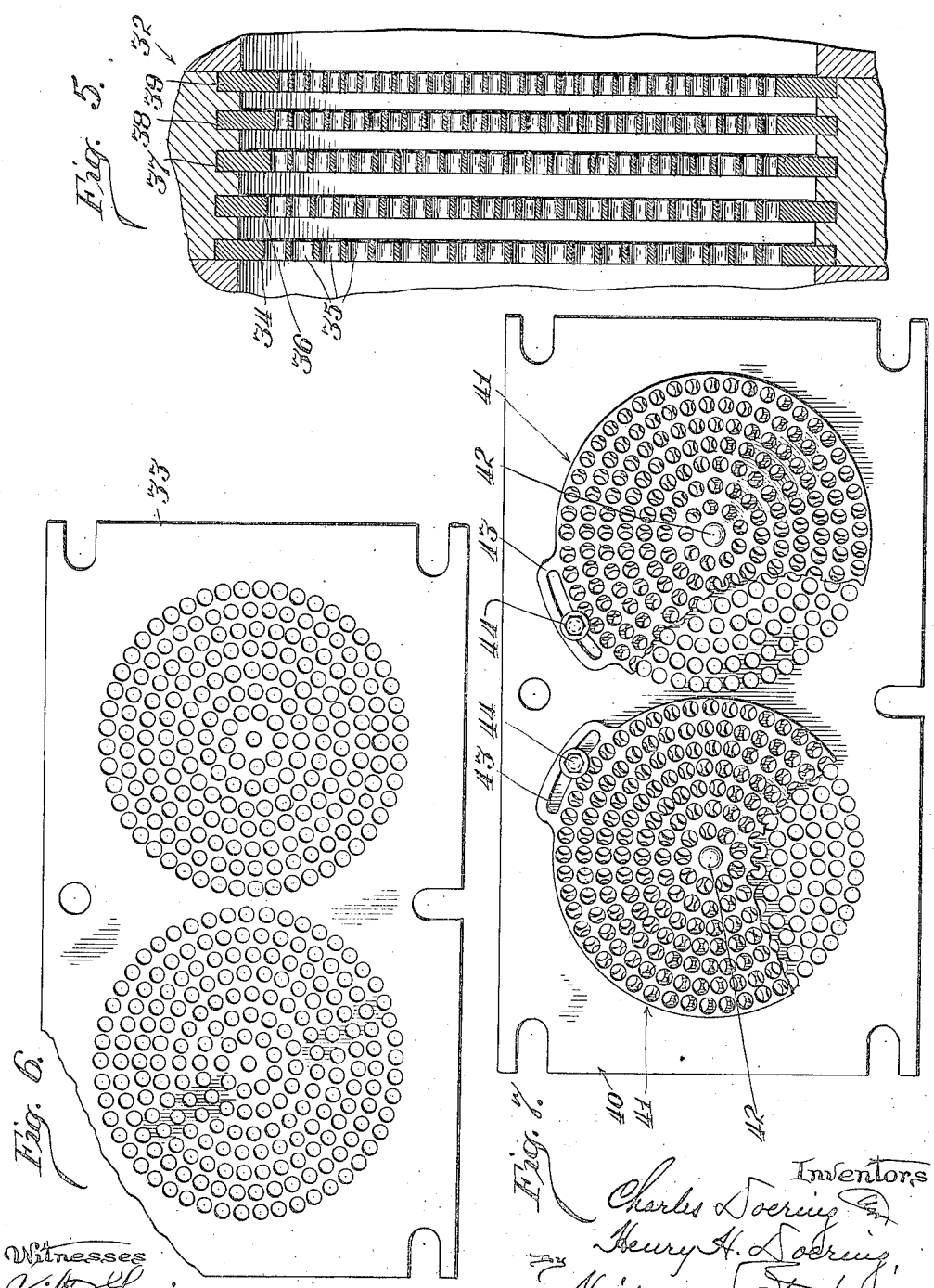

Patented Oct. 31, 1922.

1,434,049

UNITED STATES PATENT OFFICE.

CHARLES DOERING AND HENRY H. DOERING, OF CHICAGO, ILLINOIS.

METHOD OF AND APPARATUS FOR MANUFACTURING BUTTER SUBSTITUTES.

Application filed November 6, 1920. Serial No. 422,147.

*To all whom it may concern:*

Be it known that we, CHARLES DOERING and HENRY H. DOERING, citizens of the United States, and residents of Chicago, in the county of Cook and State of Illinois, have invented a certain new and useful Improved Method of and Apparatus for Manufacturing Butter Substitutes, of which the following is a description, reference being had to the accompanying drawings, which form a part of our specification.

Our invention relates to the manner of manipulating and treating the various fat crystals obtainable from vegetable oils (such as cocoanut oil, peanut oil, and the like), in conjunction with milk, and to the apparatus for carrying out the method, whereby a continuous method or system is provided for the manufacture of a butter substitute having the desired moisture and consistency; the invention contemplating an arrangement of apparatus which will permit the continuous travel of the article through the respective units of the system without contact with human hands and without undue exposure, with the result that a more sanitary article is provided; the method and apparatus at the same time producing a butter substitute which is more sanitary than that heretofore produced; while at the same time the product will have a better texture and velvety nature and an appearance more like butter. Aside from producing a superior product, the invention also permits of a great saving in time and labor.

The purposes and advantages of our invention will be readily comprehended from the detailed description of the accompanying drawings, wherein:—

Figure 1 illustrates, in side elevation, our apparatus employed for carrying out our improved method.

Figure 2 is a longitudinal sectional view of the main portion of one of the units, namely what may be termed the combined worker and blender.

Figure 3 is a detail sectional view taken on the line 3—3 of Figure 2, looking in the direction of the arrows.

Figure 4 is a longitudinal sectional view of the main portion of the print-forming unit.

Figure 5 is a detail sectional view of the discharge end of the combined worker and blender unit shown in Figure 2.

Figure 6 is a detail plan view of one of the working and blending elements employed in the worker unit as well as the moisture-controlling element employed in the print-forming unit shown in Figure 4.

Figure 7 is a detail plan view of a modified form of the element shown in Figure 6 and which may be employed more especially in the worker unit.

The apparatus, adapted to carry out our improved method and as disclosed in the drawings, comprises what is known as the emulsion unit or churn indicated at 15, which is of the construction usually employed in this art so that a detailed description and disclosure thereof need not be made. The ingredients, cocoanut oil, or other oils, milk and salt are all placed in the churn and after same have been agitated sufficiently, the emulsion or liquid is discharged by means of the conduit 16, controlled by a valve 17, into the funnel ended conduit 18 of the crystallizing tank or unit 19.

The tank or unit 19 is fluid-tight for the purpose of holding a sufficient quantity of cooling medium, namely cold brine, and is provided with an open top. The tank is preferably constructed of wood so as to have no deleterious effect on the oils or fats. The funnel ended conduit or member 18 is vertically disposed to a point near the bottom of the receptacle or tank where it terminates in a suitable coupling or T-connection shown in dotted lines at 20 in Figure 1. The hot oils or fats from the unit 15 are fed into the conduit 18 and permitted to enter the coupling member 20 at a point in advance of the discharge orifice thereof. The rear end of the coupling 20 receives the horizontally disposed portion of a conduit 21 which connects with a suitable compressed air supply; the air being discharged (when the conduit 21 is open) into the coupling 20 at a point preferably beyond the point where the hot oils or fats enter the coupling. The general construction of this portion of the apparatus is substantially identical with the apparatus shown and described in the application of one of the applicants and bearing Serial No. 359,024. The conduit 18 is also preferably provided with an outer shell or tube 22 of greater diameter than conduit 18 and open at its top, while the lower end is secured in the coupling 20 to provide an air-jacket about the conduit 18 and thus prevent the too rapid chilling of the oils or fats in their passage through conduit 18. At a point in advance of the discharge end of conduit 18, the tank is provided with a baffle or ledge shown in dotted lines at 23 provided with an upwardly inclining surface to induce the discharge mass to flow upwardly toward the opposite end of the tank or receptacle. Simultaneously with the feeding of the hot oils or fats into conduit 18, the air supply is permitted to flow through conduit 21 and the action of the air in the discharge end of the coupling 20 will entrain the oils or fats and force them into the cold brine, or other chilling medium, in the tank and induce a crystallization thereof. The action of the air and the baffle will cause the oil crystals to move toward the opposite upper end of the tank; the oils or fats being broken into small particles or globules through the action of the compressed air which at the same time provides an agitation of the water and tends to maintain a cooler condition of the water as well as to provide a finer and superior oil crystal. The oil or fat crystals are then removed by means of cloth nets or dips from the upper surface of the brine. The tank 19 at this end is provided with a screen or a strainer on which the scooped up crystals are momentarily placed to permit excess moisture to drain off and pass back into the tank 19, after which the crystals are removed from the strainer shown at 19ª and caused to flow through the conduit 24, into the receiving hopper or chute 25 of what is known as the unit or combination worker and blender indicated at 26, which, in the construction shown, is located at a lower level to permit the crystals to flow by gravity into the unit 26. This unit is somewhat similar in general construction to the butter print machine shown and described in the joint application of the present applicants bearing Serial No. 407,644; that is to say the unit 26 comprises a horizontally disposed body portion 27 provided with a pair of cylindrical channels disposed lengthwise thereof communicating with each other at a point parallel with and substantially in the same horizontal plane as the longitudinal axes of the channels, in which are mounted two worm-screws 28 which in general respects are preferably of the type and character shown and described in the last mentioned application, except that the initial engaging ends of the worms are each provided with a single, fast thread as shown at 29 in Figure 2; the thread 29 preferably extending a distance equal to the width of the hopper 25 of unit 26, so that the entering mass may be quickly fed forward into the longitudinal channels and to be there engaged and agitated by the remaining portion of the worms whereby the mass will be conveyed to the discharge head 30 which is provided with a tapering discharge orifice, as more clearly shown in Figure 2. The head is so constructed that the discharge orifice may be regulated by means of a vertically movable upper portion whereby the vertical depth of the discharge orifice may be controlled or adjusted so that the product discharged therethrough may be in the nature of a comparatively thin ribbon which, in practice, is preferably substantially an inch in thickness and approximately six inches in width; it being preferable that the product discharged from unit 26 be in as thin ribbons or portions as possible, as a more advantageous treatment of the product in the last unit or print-forming machine, disclosed at 31 in Figure 1, can thus be obtained, to produce the finished product.

The product will be thoroughly worked and blended in its passage through unit 26, both by the agitation of the worms 28 and the action of the elements now to be described. In order to provide a finer blend and product and one provided with the desired amount of moisture, unit 26 is shown provided with a plurality of perforated plates arranged in suitable spaced relation intermediate of the main or body portion of unit 26 and the discharge head 30, as indicated at 32 in Figure 2. The plates consist of a suitable metal which will not affect the product; each plate being provided with a plurality of perforations shown arranged a plurality of perforations shown arranged in circular form to conform with the circular channels in the main portion or casing 27 of the unit. These plates, one of which is illustrated at 33 in Figure 6, are provided with two series of perforations arranged side by side as shown, so as to be disposed at the ends of the two circular channels in the unit 26. The plates are preferably arranged in spaced relation of approximately an inch and a half apart, as more clearly illustrated in the detail view Figure 5, with the perforations in the respective plates made gradually diminishing in size; that is to say the first plate designated 34 in Figure 5 in practice is preferably provided with holes 35, three-eighths of an inch in diameter arranged in the concentric circular manner shown; while the next plate 36 is provided with holes arranged in a similar circular manner but preferably five-sixteenth of an inch in diameter; each succeeding plate 37, 38 and 39 being provided with the concentrically arranged holes or perforations which are one-sixteenth of an inch smaller in diameter than the preceding plate, as clearly shown in Figure 5. The plates are secured in any suitable manner in the unit 26 by means of the bolt holes and slots as shown in Figure 6, with the plates arranged in suitable grooves formed in the discharge end of the unit as shown. In practice, it is preferable to employ a number of plates, as for example five in number, so as to produce the desired result, whereby a thorough blending is obtained and a more efficient distribution of the moisture provided; it being understood that the material is forced by the feed-screws or worms through the respective plates in vermicular form or small cylindrical portions which ultimately are again brought together into a more or less compact mass by the tapering throat construction which causes the moisture which adheres to the pencil form portions to be encased therebetween, in successively lesser quantity, as the product passes through each succeeding plate.

In practice, it may be found desirable with varying temperatures and different ingredients or oils from which the butter substitute is produced, to provide slightly smaller sized openings or perforations than the perforations in the respective plates. We therefore show a modified form of foraminated plate 40, which is provided with the additional plates 41, preferably circular or of disc form and of a diameter sufficiently large to extend slightly beyond the outer row or circle of perforations in the plate 40. These additional plates or discs 41 are each pivoted at 42 on what may be termed the forward or pressure side of plate 40, namely the side toward the worm-screws, as illustrated in Figure 7. These plates 41 are each provided with circular series of perforations of size and arrangement similar to the perforations in the respective main plates to which the discs are secured. The plates 41, as is evident from the arrangement shown, may be moved on their respective pivots 42, so as to move the perforations of plates 41 out of complete register with the perforations in the main plate to which the discs or plates 41 are secured, with the result that the combined passage through the foraminated plates and discs may be reduced in diameter to any desired size within a given range, thereby causing the material to be divided into finer cylindrical portions than would be the case where the perforations of plates 41 are in full or complete register with the perforations in the main plate. In order that the auxiliary plates or discs 41 may be held in firm adjusted relation with the main plate, either the discs or the main plate may be provided with an arcuate slot as shown at 43 in the discs in Figure 7, for the passage of a set-screw 44 secured in this instance to the main plate 40. With this construction it is evident that loosening of the set-screws or bolts 44 out of clamping relation with the auxiliary plates or discs will permit such rotation of the auxiliary plates 41 as may be desired to produce the sized openings required; the adjusted positions of the discs being maintained by screwing up the set-screws or bolts.

The material after passing through the various perforated plates adjacent the discharge end of the worker and blender unit 26 is discharged in comparatively thin ribbon form through the adjustable outlet 30 onto a series of rollers suitably mounted as shown at 45 in Figure 1 which causes the material to travel and move onto an endless member or belt 46 which is disposed about suitable pulleys 47 and 48, mounted respectively at the end of the worker 26 and adjacent to the hopper 49 of the print-forming unit 31; the pressure of the worm-screws in the worker unit will place the material under sufficient pressure to induce its travel upwardly with the belt or conveyor 46, with the result that it will be discharged into the hopper 49 of the print-forming unit 31, as shown in Figure 1.

The worker and blending unit 26 will not only thoroughly mix and blend the various crystals and brine, but the series of plates 34, 36, 37, 38 and 39 will provide the material with the desired amount of moisture, while the excess moisture will be caused to flow or drain therefrom through a suitable opening 50 formed in the receiving end of the unit, at a point preferably immediately above and adjacent to the bearings of the worms 28; the opening 50 being preferably provided with a suitable screen as at 51.

As the excess moisture carries with it a certain amount of the fat or oil crystals, milk and brine, the unit 26, at a point beneath the main casing 27 thereof, is shown provided with a suitable removable tray as at 52 adapted to receive the discharged excess moisture and thus prevent the waste of any of the product which may pass out with the outflowing moisture. The tray 52 may from time to time be removed and its contents emptied into the crystallizing tank or unit 19. To induce the excess moisture to flow out of the unit 26, the latter is preferably arranged at a very slight inclination toward the discharge end thereof, thereby causing the excess moisture to flow toward the receiving end of the unit 26 and to pass through the outlet 50 and into the tray or receiving vessel 52 as described.

In some installations of our apparatus, the unit 26 may be placed at a higher level than the tank or unit 19. Where the unit 26 is thus disposed with relation to tank 19, the tray 52 for receiving the excess moisture may then be arranged to drain off into the tank 19 to conserve all the ingredients employed in the manufacture of the butter substitute. With the arrangement of the units as just described, it is evident that the necessity for manually removing the drain tray 52 will be obviated. Where the units are arranged as shown in Figure 1, when desired, the excess moisture from tray 52 may be forced back into the tank 19 by means of any suitable pump which may be operated from the power whereby the units of our improved apparatus are actuated.

The material which has passed through unit 26 and discharged into the hopper 49 of print-forming unit 31, drops down into the longitudinal channels of unit 31, which are formed as described in the previous application referred to; the material being engaged by the worms 53, see Figure 4, whereby it is fed toward the discharge end of unit 31 and caused to pass through a perforated plate 54 which may be substantially identical with the perforated plate disclosed in the prior application Serial No. 407,644. The print-forming unit subjects the material to additional working and also extracts some of the moisture therefrom, through the action of plate 54 which causes the material also to be fed through in minute cylindrical particles whereby the correct amount of moisture is provided in the finished product; the moisture being retained between the various cylindrical portions which pass into the regulable head or discharge end 55 of the print-forming unit 31. The discharge end of the print-forming unit 31 is preferably provided with an adjustable throat, substantially similar to that disclosed in the application Serial No. 293,712, whereby the material is formed into ribbons or strips of the desired thickness and width, which are subsequently cut into print form by means of the cutting mechanism shown in application Serial No. 293,712, which is usually manually operated. The cut prints are caused to travel across the loosely mounted rollers shown at 56 and pass onto an endless belt or table 57 where the operators apply suitable wrapping material such as waxed paper and the like, without, however, necessitating the actual physical contact with or handling of the prints. As is evident from the operation of our improved apparatus and method, a more sanitary produce is produced than has heretofore been the case.

We have shown and described our invention embodied in a form which we at present consider best adapted to carry out the purposes of the invention, but it will be understood that the invention is capable of modifications without, however, departing from the spirit of the invention.

What we claim is:—

1. A method which consists in emulsifying vegetable oils with milk, pressing the emulsion so formed through a chilling medium to provide oil or fat crystals, removing said crystals from the chilling medium, working the amassed crystals, blending the same by dividing said mass into finely divided portions of vermicular form to express excess moisture therefrom, compressing the finely divided portions so as to encase the adhering moisture therebetween and to entrap a comparatively small amount of air.

2. A method of the character described, which consists in emulsifying vegetable oils with milk, forcing the emulsion so formed through a chilling material by the action of air under pressure so as to crystallize the oils of fats into globules, combining the oil crystals and subjecting the same to a working operation, dividing the combined mass into finely divided portions to express excess moisture therefrom, compressing said finely divided portions and subjecting same to a further working, again dividing said last mass into finely divided vermicular portions and compressing said portions into a single mass so as to entrap a comparatively small amount of air.

3. A method of the character described, which consists in emulsifying vegetable oils with milk, causing the emulsion so formed to pass through a cold brine, removing said crystals from the brine and subjecting the same to a working and blending operation, forcing said worked mass through a multiple of foraminated members so as to divide said mass into vermicular portions of decreasing thickness to express excess moisture therefrom, and compressing said vermicular portion into compact form so as to entrap a comparatively small amount of air therein.

4. Apparatus for manufacturing a butter substitute, comprising a churn in which the vegetable oils with the milk are emulsified, a cold brine containing receptacle, means whereby the emulsion from the churn may be conveyed into the bottom of said cold brine receptacle, means whereby compressed air is supplied to the discharge end of the first means, conveying means for the resultant oil crystals, an initial worker unit into which the crystals are discharged, said unit comprising a casing provided with a passage having a rotating worm or screw whereby the mass is worked, a plurality of foraminated members arranged in spaced relation at the delivery end of said passage and the delivery end of said passage formed to combine the finely divided portions into a single mass of ribbon form, means for receiving said mass from the delivery end and to convey the same therefrom, and a second worker unit provided with a longitudinal passage having a screw member rotatably mounted therein, with the delivery end of said passage made regulable and adapted to compress the re-worked mass into ribbon form of predetermined cross-sectional dimensions.

5. In a system of the character described, a working and blending unit comprising a casing provided with receiving and discharging ends, screw conveyors located intermediate of the ends and in parallel relation within the casing, a plurality of foraminated members, intermediate of the screw conveyors and said discharge end, through which the material is forced, said foraminated members being arranged in predetermined spaced relation, each succeeding member being provided with series of perforations differing in size from those of the preceding member, and means disposed at the discharge end of the casing whereby the divided portions of the material are compressed into compact form of predetermined dimensions.

6. In a system of the character described, a working and blending unit comprising a casing provided with a receiving hopper and a discharge end, cylindrical channels intermediate of the hopper end and discharge end of the casing, a worm-screw rotatably mounted and disposed longitudinally of each channel, the receiving ends of the worm-screws at a point beneath the hopper being provided with a single quick spiral of length substantially equal to the width of the hopper, a plurality of foraminated members, each provided with a series of perforations registering with the discharge ends of the cylindrical channels, said members being arranged in predetermined spaced relation, with the succeeding plates provided with perforations of gradually diminishing diameter, and a regulable throat at the discharge end of the casing whereby the divided particles are compressed into compact form of a predetermined size.

7. In a system of the character described, a working and blending unit comprising a casing provided with a pair of cylindrical channels communicating with each other throughout the length of the channels at a point substantially in the same horizontal plane as the axes of said channels, a worm-screw disposed lengthwise of each channel, a plurality of foraminated members disposed at the ends of said worm-screws, each member being provided with two series of concentrically arranged perforations, means whereby the size of the perforations in said members may be regulated, and a regulable throat at the discharge end of said casing whereby the divided portions of the material are compressed into compact form of predetermined dimensions.

8. In a system of the character described, a working and blending unit, comprising a casing provided with a pair of cylindrical channels communicating with each other throughout the lengths thereof at a point substantially in the same horizontal plane as the longitudinal axes of said channels, a worm-screw disposed lengthwise of each channel, means whereby excess moisture may discharge from said channels without permitting discharge of the material, a plurality of foraminated members arranged at the ends of the worm-screws and in spaced relation with each other, said members being provided with series of concentrically arranged perforations registering with the discharge ends of the channels, the perforations of each succeeding member gradually diminishing in diameter, and a regulable throat at the discharge end of the casing whereby the divided particles are compressed together and formed into a mass of predetermined dimensions.

CHARLES DOERING.
HENRY H. DOERING.

Witnesses:
B. AMONDSEN,
G. HEIDMAN.